United States Patent [19]
Kanai

[11] Patent Number: 4,856,847
[45] Date of Patent: Aug. 15, 1989

[54] AUTOMOTIVE SEAT WITH WALK-IN DEVICE
[75] Inventor: Shigeru Kanai, Akishima, Japan
[73] Assignee: Tachi-S Co., Ltd., Akishima, Japan
[21] Appl. No.: 315,453
[22] Filed: Feb. 24, 1989
[51] Int. Cl.$^4$ ............................................. B60N 1/02
[52] U.S. Cl. ...................................... 297/341; 248/429
[58] Field of Search ................ 297/341, 346; 248/430, 248/429

[56] References Cited
U.S. PATENT DOCUMENTS

| 4,101,169 | 7/1978 | Muraishi et al. | 297/341 |
| 4,639,038 | 1/1987 | Heling | 297/341 |
| 4,648,657 | 3/1987 | Cox et al. | 297/341 |
| 4,671,571 | 6/1987 | Gionet | 297/341 |
| 4,707,030 | 11/1987 | Harding | 297/341 |
| 4,742,983 | 5/1988 | Nihei | 297/341 X |

Primary Examiner—Peter A. Aschenbrenner
Attorney, Agent, or Firm—Browdy & Neimark

[57] ABSTRACT

An automotive seat with a walk-in device, in which a rotatable lever plate of the walk-in device and a link member are arranged at one of a pair of slide rails which are provided under the seat, and a connecting wire of the walk-in device is extended between the rotatable lever plate and link member. Thus, all required elements of the walk-in device are disposed along such one of two slide rails, and as such, the connecting wire is prevented from contact with the bottom of the seat and can be attached directly to the walk-in device without need to extend it transversely of the seat.

6 Claims, 5 Drawing Sheets

AUTOMOTIVE SEAT WITH WALK-IN DEVICE

BACKGROUND OF THE INVENTION

1. Field of the Invention

The present invention relates to an automotive seat, and particularly is directed to an automotive seat provided with a walk-in device in which the forward inclination of the seat back of the seat leads to automatic forward movement of the seat by means of the walk-in device, thereby permitting an occupant to enter the rear seat section of the automobile and sit on the rear seat.

2. Description of the Prior Art

Generally, most of the automotive seats with a walk-in device are constructed such that under the seat cushion thereof, provided are pair of slide rails for slidingly adjustments of the seat in its longitudinal direction and at one of the slide rails, there is provided a walk-in device for effecting an automatic forward movement of the seat for allowing a rear-seat occupant to sit on a rear seat in the automobile, while on the other side at the other of the slide rails, attached is an operation device for the walk-in device, with a flexible connecting wire being extended between the walk-in device and operation device for an operative connection therebetween.

In assembling the above-mentioned seat with walk-in device, the attaching of the connecting wire, especially, involves the steps of assembling the seat complete with the slide rails, walk-in device, and operation device for the walk-in device and turning upside down the seat, in advance, and thereafter, extending the connecting wire between the walk-in device and operation device. Thus, in the resulting seat, the connecting wire extends transversely the bottom of the seat.

As a consequence of this, the steps of attaching the connecting wire are quite troublesome, and in particular, the fact that the connecting wire is extended under the seat transversely in its width-wise direction, results in a great likelihood of an undesired contact occurring between the connecting wire and the the bottom surface of the seat when the seat cushion is flexed downwardly due to the load of an occupant who sits thereon, so that a malfunction takes place in the operation of the walk-in device. Further, a long period of repetition of such contact will loosen the wire, rendering the same gradually longer, which prevents the normal action of the walk-in mechanism.

SUMMARY OF THE INVENTION

It is a first purpose of the present invention to provide an automotive seat with a walk-in device which eliminatesthe need for extending a connecting wire transversely of a seat cushion of the seat and further prevents the connecting wire from being loosened in a positive manner.

For such purpose, in accordance with the present invention, the walk-in device is essentially composed of a rotatable lever plate, a link member located in a reclining device attached in the seat, a connecting wire extended between the rotatable lever plate and link member, a latching plate and an actuator pin. The latching plate and actuator pin are to be moved by the rotatable lever plate so as to actuate a locking mechanism for locking and unlocking the seat. Thus-constructed walk-in device is provided at one of a pair of slide rails, such that the rotatable lever plate and link member are disposed on the same line, along the slide rail, whereupon the connecting wire is extended along the slide rail.

Accordingly, the connecting wire is only disposed along the slide rail, not transversely of the seat, and the entire length of the wire per se is rendered short, which ensures avoiding the loosening of the wire, more effectively.

It is a second purpose of the present invention to provide the automotive seat with walk-in device, which permits the connecting wire to be attached thereto without turning upsidedown the seat.

For such purpose, in accordance with the present invention, both rotable lever plate and link member are mounted on the upper rail of the slide rail.

Accordingly, in assembling the seat, the connecting wire is attached directly to those rotatable lever plate and link member and then extended therebetween, so that there is eliminated the need for turning upside down the seat in order to extend the wire under and transversely of the seat, as encountered in the above-mentioned prior art.

It is a third purpose of the present invention to provide the automotive seat with walk-in device, in which a memory device used for precise return of the seat to its original seating position is simplified in structure.

To this end, in accordance with the present invention, the memory device is only comprised of a memory plate integral with the walk-in device and a forward edge of lower rail of the slide rail. The memory plate is integrally provided at the latching plate of the walk-in device, having a free end which is normally in a sliding contact with the lateral wall of the lower rail. In the case that, when the seat, which has been moved forwardly for walk-in purpose, is moved back to its normal seating position, the free end of the memory plate collides with and rides over the forward edge of lower rail, thereby rotating the latching plate of the walk-in device to actuate the locking mechanism via the actuator pin so as to lock the seat at its original seating position.

Accordingly, the memory device is simply formed by providing such memory plate to the latching plate, excepting the forward edge of lower rail which is already formed in assembling the slide rail. This extremely simplifies the structure of a memory device used in this kind of walk-in device.

DETAILED DESCRIPTION OF PREFERRED EMBODIMENT OF THE INVENTION

Figure 1:
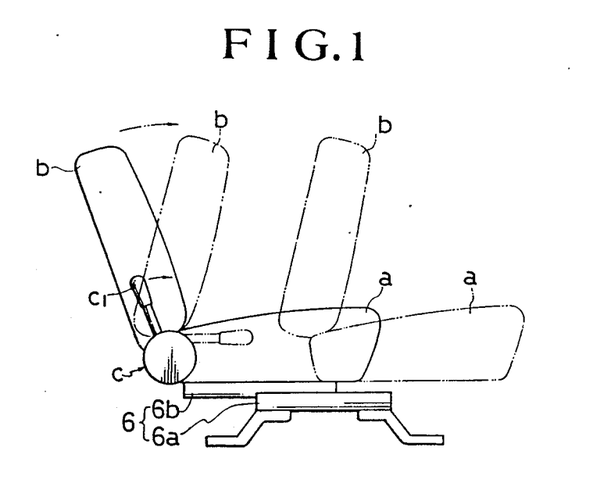
FIG. 1 is a schematic sketchy view showing the walk-in operation of a seat, using a walk-in device in accordance with the present invention.

Referring to FIG. 1, there is roughly illustrated an automotive seat (A) whichis provided with a walk-device which will be described later.

Designations (a) and (b) denote a cushion seat and seat back, respectively, which form the seat (A).

The cushion seat (a) is mounted on a slide rail (6) which comprises an upper rail (6b) and a lower rail (6a, the upper rail (6b) being slidably fitted in the lower rail (6a) such as to be movable along the longitudinal direction of the lower rail (6a), and the lower rail (6a) being fixed on the floor of an automobile (not shown). Although the slide rail (6) is shown as being provided in a singular form, yet practically, other slide rail is provided at the other opposite side, and thus it should be understood that in this embodiment, there are a pair of slide rails under the seat (A), as is normally the case with most of ordinary seat constructions of this kind.

The seat (a) is adjustably locked at a desired point along its longitudinal direction by means of a locking mechanism which will be stated later (namely at the designation of (83), (8), (82), in FIG. 2) via the slide rail (6).

The seat back (b) is connected with the seat cushion (a) via a reclining device (c) in a manner allowing the seat back (b) to be forwardly and rearwardly inclined with respect to the seat cushion (a).

With this structure, referring again to FIG. 1, it can be observed that the forward inclination of the seat back (b) from its upstanding posture at the sold line down to its inclined point at the phantom line actuates the walk-in device to release the locked state of the seat (A), with the result that the seat (A) is then caused to move forwardly as indicated by the arrow to the point in the phantom line, by means of forwardly urging means (not shown, but preferably a helper spring). After such walk-in operation, when the seat (A) is moved back towards its normal seating position, a memory device (not shown in FIG. 1, but will be explained later) is actuated so as to ensure the return of the seat (A) to its original seating position.

Designation (c1) refers to an operation lever of the reclining device (c). The use of the lever (c1) permits the forward inclination of the seat back (b).

Figure 2:
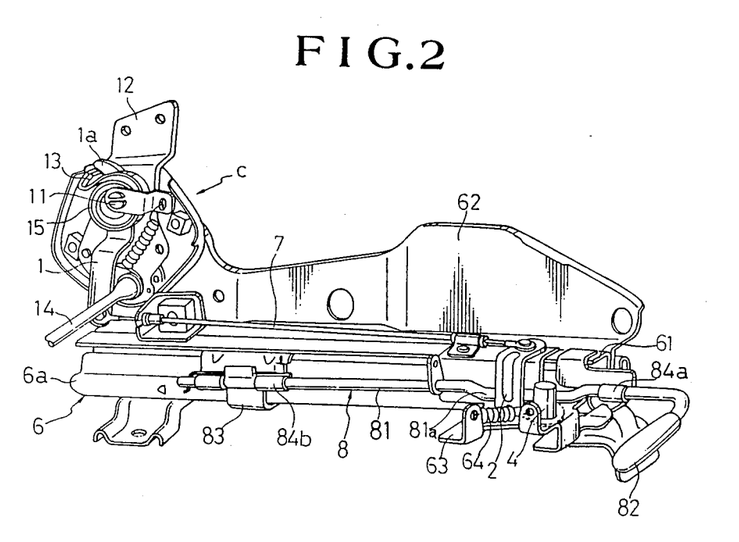
FIG. 2 is a perspective view of principal parts of the present invention.
Figure 3:
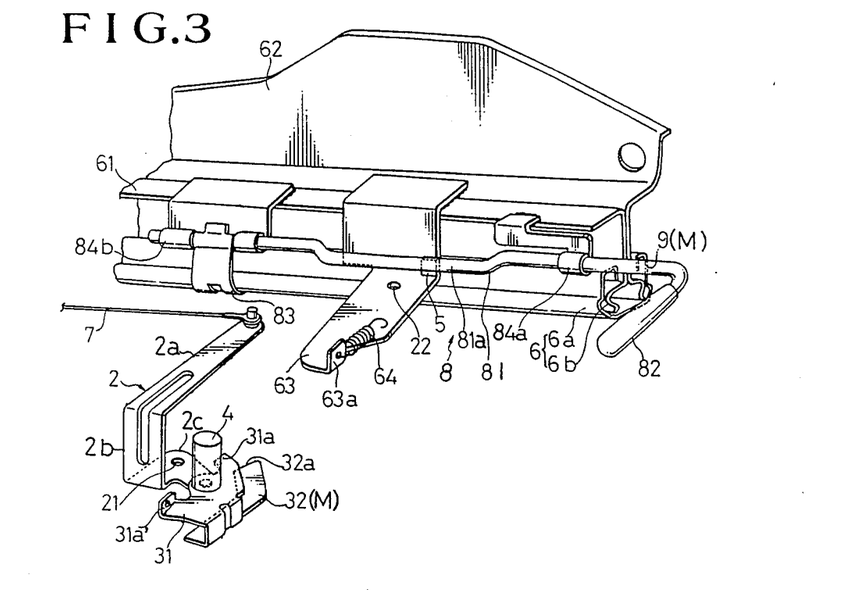
FIG. 3 is a partially broken, exploded perspective view of the principal parts of the present invention.

Referring to FIGS. 2 and 3, illustrative are whole principal parts of the walk-in device (W) and memory device (M) in accordance with the present invention.

The walk-in device (W) is provided upon the upper rail (6a) of the slide rail (6). As best shown in FIG. 3, the walk-in device (W) is disposed at the forward end portion of the upper rail (6), and as its main parts in accordance with the present invention, comprises a rotatable lever plate (2), a latching plate (3), a connecting wire (7), an actuator pin (4) and a link member (1) (see FIG. 2).

The rotatable lever (2) is essentially composed of an outwardly extended upper lever part (2a) which is oriented in a direction outwardly of the slide rail (6) and extended over the horizontal upper flange portion (61) of the upper rail (6b) associated with the slide rail (6), an intermediate lever part (2b) extending perpendicularly from the base end of the upper lever part (2a), and a dogleg-shaped lever part (2c) which extends in a direction same with that of the upper lever part (2a) in parallel therewith, the dogleg-shaped lever part (2c) being at its bent center area formed with a hole (21) which acts as a rotation center of the rotatable lever (2). All of those lever parts are integrally formed together, and thus-constructed rotatable lever (2) is rotatably secured on a support bracket (63) by means of a securing pin (2a) passing through the hole (21) of the rotatable lever (2) and hole (22) of the support bracket (63), so that the lever (2) is free to rotate about such two coaxially juxtaposed holes (21)(22).

The latching plate (31) is mounted on the free end of the dogleg-shaped lever part (2c) of the rotatable lever (2) in a free-to-rotate fashion by means of the actuator pin (4) which is formed in a cylindrical shape and erects upon the latching plate (31), as shown. The latching plate (31) is essentially composed of a hook part (31a) and a base end part (31'a), such that those two parts (3aa)(31'aa) are disposed on the opposite sides of the center point of the latching plate (31) where the actuator pin (4) is located. To the base end part (31'a) of the latching plate (31), connected is the one end of a spring (64) which is in turn at its other end connected to the lug (63a) formed in the extremity of the support bracket (63), whereby the hook end part (31a) of the latching plate (31) is normally urged by the contracting force of the spring (64) in a direction towards an engagement segment (5) formed integrally in the support bracket (63) for a positive engagement with the segment (5) as will be stated later, but not engaged therewith in this state.

Figure 4:
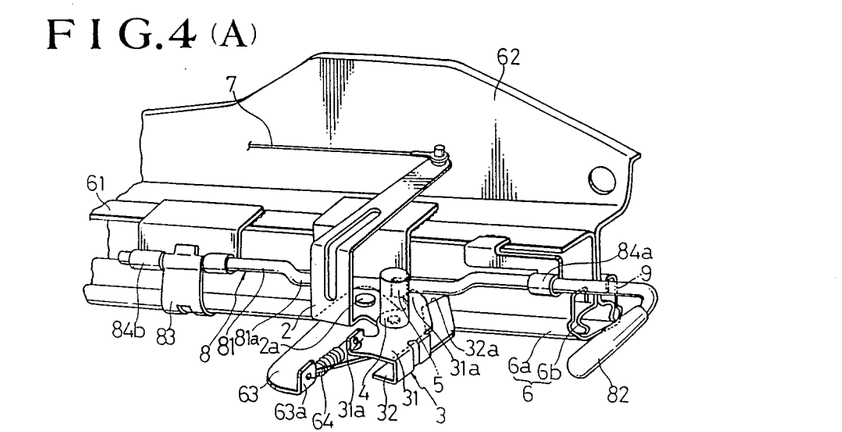
FIG. 4(A) is a partially broken perspective view of the principal parts of the present invention.
FIG. 4(B) is a plan view of the same principal parts as in the FIG. 4(A)
FIG. 4(C) is a sectional view taken along the line X—X in the FIG. 4(B)

Referring now to FIGS. 3 and 4(c), as previously stated, the upper rail (6b) is at its upper end formed with the horizontal upper flange portion (61), which is formed by welding together two steel plates (6b-1) (6b-2) whose configurations are seen in FIG. 4(c). wherein each of them has at its upper end a horizontally extending bent portion which thus forms the horizontal upper flange portion (61). At the horizontally extending bent portion of the outside steel plate (6b-2), is integrally formed a upstanding bracket (62). Hence, the horizontal flange portion (61) of the upper rail (b) defines an outwardly recessed area as can be seen from the figures.

As shown in FIG. 3, a locking mechanism (8) is provided inside the slide rail (6), and more specifically the locking mechanism (8) includes a lock rod (81), a lock lever (82), and lock segment (83), wherein the lock rod (81) extends along the longtudinal direction of the slide rail (6) and is supported by a pair of spaced-apart support members (84a) (84b) each fixed on the horizontal flange portion (61) of the upper rail (6b) in a rotatable manner, and the lock rod (81) is formed at its mid-way part with a crank portion (81a) which is in a contact with the actuator pin (4) associated with the walk-in device (W). The lock segment (83) is fixed on the rearward end portion of the lock rod (81), and as best seen in FIG. 4(C), has a horizontally extending leg (83a) whose free end is provided with a hook-like portion (83b). Although not clearly shown, there are arranged a plurality of equidistant apertures at the designation (6a') in the bottom of the lower rail (6a), and therefore, the hook-like portion (83a) of the lock segment (83) is to be engaged into the aperture (6a'), thereby placing the slide rail (6) in a locked state, as in FIG. 4(c). In this connection, the lock lever (82) is retained at its locked position by means of a suitable spring (not shown) against undesired rotation. Accordingly, when it is desired to release the locked state of the slide rail (6), the lock lever (82) is rotated upwardly, overcoming the force of spring, so as to rotate the lock segment (83) to disengage its hook-like portion (83b) out of the aperture (6a'). Then, the slide rail (6) is unlocked, and the upper rail (6b) is then permitted to slidingly move along the lower rail (6a). In this particular case, as there is no occupant seated on the seat (A) to enable another occupant to sit on a rear seat, the seat (A) is caused by the helper spring to move forwardly, giving a space therebehind as a walk-in operation, as will be described later.

At the rearward portion of the bracket (62), is mounted the reclining device (c) of a known type wherein a rotatable bracket (12) is secured at the rotation shaft (11) such as to be rotatable thereabout, the rotatable bracket (12) being connected with a frame part of the seat back (b), and at the rotation shaft (11) is provided a return spring (15) which serves to bias the shaft (11) to rotate in a direction to cause forwardly inclination of the seat back (b). Numeral (14) refers to a connecting rod (14) which connects operatively the reclining device (c) to other one (not shown) disposed at the other slide rail for effecting a coactive motion of the two reclining devices.

As best shown in FIG. 2, from the rotation shaft (11), there extends the above-mentioned link member (1) of the walk-in device (W) in a downward direction, with the lower free end thereof being disposed adjacently above the horizontal flange portion (61) of the upper rail (6a). The link member (1) is rotatably secured on the rotation shaft (11) and has an upper projected part (1a) formed at its upper end. In the reclining device (c), a projected lug (13) is integrally formed on the rotatable bracket (12) and situated in the proximity of the upper projected part (1a) of the link member (1). By being so constructed, when the seat back (b) is inclined forwardly, the rotatable bracket (12) is caused to rotate, and the projected lug (13) integral with the bracket (12) is rotated simultaneously to abutment against the upper projected part (1a) of the link member (1), whereupon as the seat back (b) is further inclined forwardly to the point indicated by the phantom line in FIG. 1, the link member (1) is caused to rotate about the rotation shaft in the arrow direction in Fig. FIG. 2.

Between such lower free end of the link member (1) and the upper free end of the rotatable lever (2), is extended the above-stated connecting wire (7) along the longtiudinal direction of the slide rail (6).

It is noted here that the connecting wire (7) is given a certain tension by means of a spring (not shown) via the link member (1) to thereby avoid the loosening of the wire (7) for the purpose of assuring failure-free action of the wire (7) to transmit a force to the walk-in device (W).

The memory device (M) is essentially constructed by a memory plate (32) and the forward edge (9) of the formed with the latching plate (31) of the walk-in device (W) in such a manner that the memory plate (32) is disposed under the latching plate (31), and that the free end (32a) of the memory plate (31) is so formed as to extend towards at a point where it is to be abutted against the edge (9) of the lower rail (6a) when the hook part (31a) of the latching plate (31) is engaged with the engagement segment (5) at the support bracket (63). According to this memory device (M), when the seat (A) is moved forwardly for walk-in operation, the upper rail (6b) is advanced telescopically from the lower rail (6a) forwardly as indicated by the arrow in FIG. 5(A), with the forward edge (9) of the lower rail (6a) being left at its fixed position, and therefore, when after such walk-in operation the seat (A) is moved back, the free end (32a) of the memory plate (32) is moved towards and collides with the forward edge (9) of the lower rail (6a), whereby both memory plate (32) and latching plate (31) are caused to rotate about the actuator pin (4) and thus the hook part (31a) of the latching plate (31) is disengaged from the engagement segment (5), as will become apparent later. Then, the lock segment (83) is caused to rotate, with its hook-like portion (83b) being engaged into the home aperture (6a'), and the seat (A) is locked correctly at its normal seating position.

Now, by referring to FIGS. 4(A), 4(B) and 4(C) through 5(A), 5(B) and 5(C), a description will be made of a practical operation of the above-described walk-in device (W) and other associated peripheral elements.

Figure 5A:
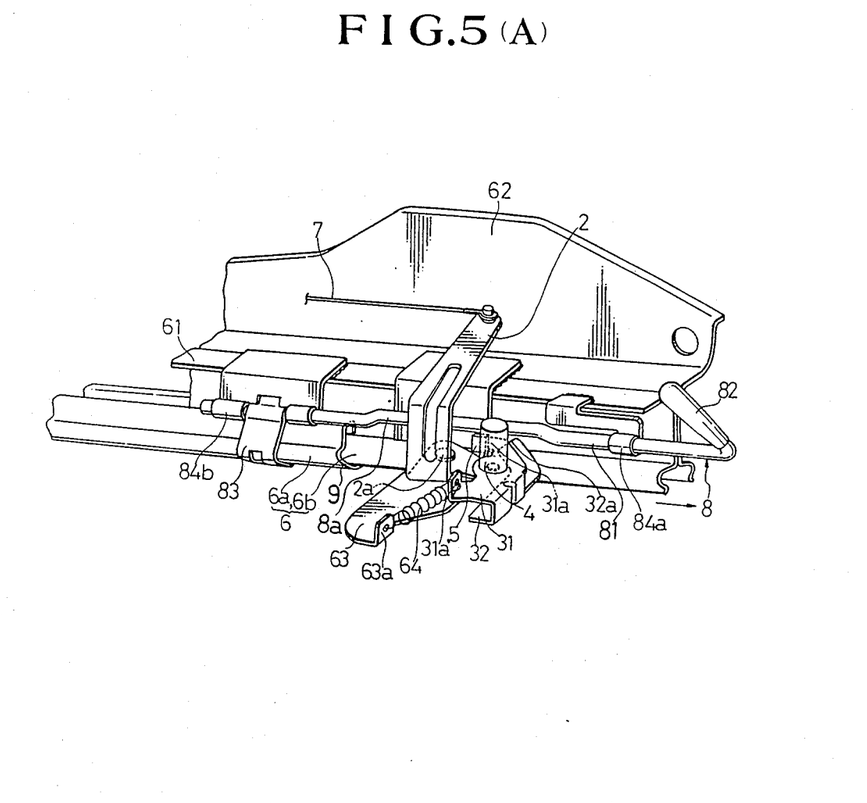
FIG. 5(A) is partially broken perspective view of the principal parts of the present invention, showing the walk-in operation thereof.

At first, referring to FIGS. 4(A), 4(B) and 4(C), there is shown a normal state of the seat (A), in which the latching plate (31) stands disengaged from the engagement segment (5), with the free end (32a) of the memory plate (32) being positioned adjacent to the lateral wall of the lower rail (6a) and the lock segment (83) is engaged into the aperture (6a'). Under this condition, when the lock lever (82) is rotated upwardly as shown in FIG. 5(A), the lock rod (81) is caused to rotate, which in turn causes the simultaneous rotation of the lock segment (83) from engagement with the aperture (6a'), or specifically, causes the disengagement of the hook-like portion (83b) of the lock segment (83) from the aperture (6a') as in FIG. 5(C), thus releasing the locked state of the slide rail (6) and allowing the free slidability of the upper rail (6b) along the lower rail (6a). This state indicates that an occupant may adjust the position of the seat (A) in its longitudinal direction. When it is desired to lock the slide rail (6), then the occupant releases the lock lever (82) from his or her hand, which will allow the lock rod (81) to be rotated by the returing from of the aforementioned spring, and simultaneously the hook-like portion (83b) of the lock segment (83) is brought to engagement into a selected one of the apertures at the lower rail (6b), as understandable from FIG. 4(C), whereupon the slide rail (6) or the seat (A) is locked at the selected position in its longitudinal direction.

Figure 5B:
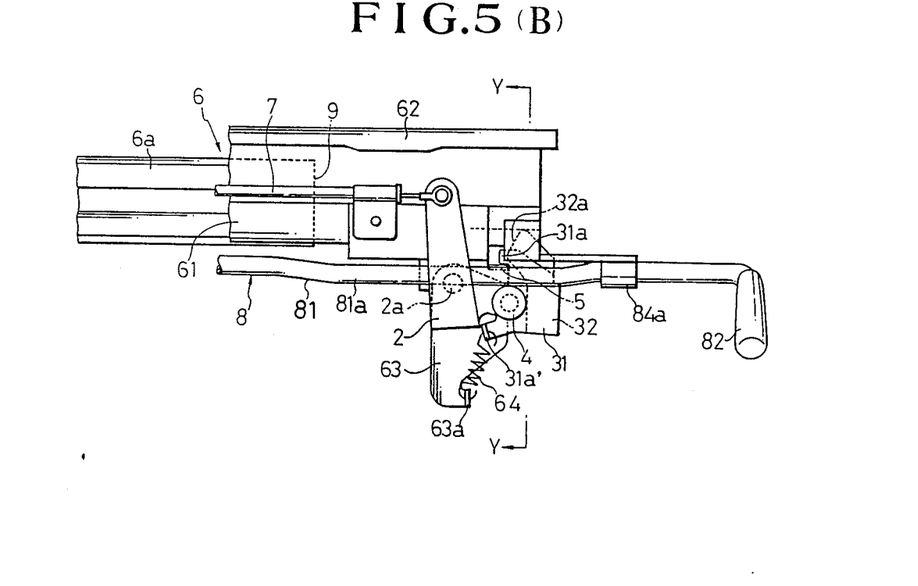
FIG. 5(B) is a plan view of the same principal parts as in the FIG. 5(A)
Figure 5C:
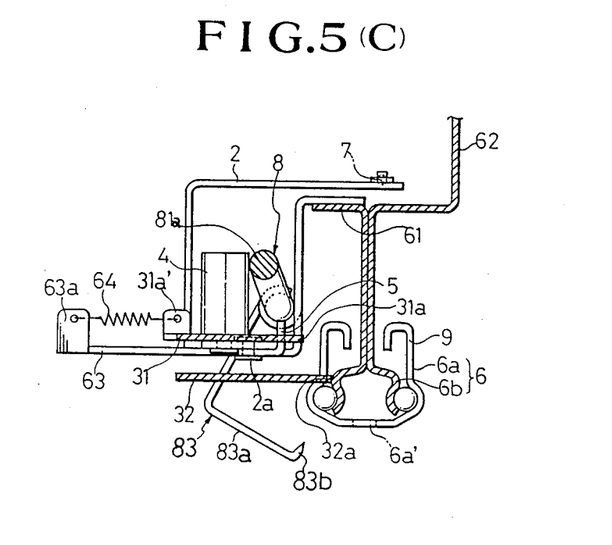
FIG. 5(C) is a sectional view taken along the line Y—Y in the FIG. 5(B).

In conjuction with the above-described motion of the slide rail (6) under the control of the lock lever (82), a description will be given as to the walk-in device (W), with reference to FIGS. 5(A), 5(B) and 5(C). Firstly, when the walk-in operation is required for a rear-seat occupant to access to a rear seat behind the seat (A), the seat back (b) of the seat (A) is forwardly inclined towards the seat cushion (c), and then, the link member (1) of the walk-in device (W) is caused to rotate through the abutment of the projected lug (13) of the reclining device (W) against the upper projected part (1a) of the link member (1) as previously stated, in the arrow direction in FIG. 2, which draws the connecting wire (7) in the same direction so as to cause the rotation of the rotatable lever plate (2) about the pin (2a), as shown in FIG. 5(A). In response to such rotation of the rotatable lever plate (2), the latching plate (31) including the actuator pin (4) as well as the memory plate (32) are caused to move towards the slide rail (6) by the reason that those element are disposed upon the free end of the dogleg-shaped part (2c) of the rotatable lever plate (2) and are free to move forwardly and rearwardly relative to the pin (2a) in direction towards and away from the slide rail (6). At this moment, therefore, it is seen that the actuator pin (4) is being moved towards the crank portion (81a) of the lock rod (81), the hook part (31a) of the latching plate (31) is being contacted with the engagement segment (5) of the support bracket (63) and being about to engage the same, and also, the free end (32a) of the memory plate (32) is being brought towards the lateral wall of the lower rail (6b). Consequently, upon the contact and pressure of the actuator pin (4) against the crank portion (81a, the lock rod (81) is caused to rotate so as to release the engaged state of the lock segment (83) with the lower rail (6b), as shown in FIG. 5(C), placing the seat (A) in an unlocked sate and allowing it to be movable forwardly via the slide rail (6), while at the same time, the hook part (31a) of the latching plate (31) is just hookingly engaged over the engagement segment (5) and retained as such by the pulling force of the spring (64), thereby positively preventing the lock rod (81) against reverse rotation and serving to reatain the unlcoked state of the seat (A) in a provisional sense.

Accordingly, under such state, the upper rail (6b) is moved forwardly in the arrow direction as in FIG. 5(A) by means of the forwardly biasing force of the previously stated suitable mens such as a helper spring, as a result of which, the seat (A) is moved from the solid line, forwardly, to the phantom line.

As is apparent, with the forward movement of the upper rail (6b) on the lower one (6a), the memory plate (32), by reason of its being mounted on the upper rail (6b), is transferred forwardly, as with the peripheral elements such as the rotatable lever plate (2) or locking mechanism (8) mounted on the upper rail (6b), and it is thus seen that, initially, until the memory plate (32) passes by the forward edge (9) of the lower rail (6a), the free end (32a) of the memory plate (32) is being in a sliding contact with the inner lateral wall of the lower rail (6a), and then, shortly after passing by such edge (9), the forward edge (9) is brought into a sliding contact with the lateral wall of the upper rail (6b).

The seat (A) is stopped at a give point, standing at a forwardly located state, presenting a space therebehind, enough for a rear-seat occupant to enter the rear room of the automobile and sit on the rear seat.

Subsequent to the walk-in procedure, when it is desired to return the seat (A) to its original seating position, the seat (A) is forcibly moved back against the forwardly biasing force of the helper spring, in a direction form the phantom line to the solid one as in FIG. 1. During this seat returning procedure, the foregoing free end (32a) of the memory plate (32) is also moved in the same direction, heading towards the forward edge (9) of the lower rail (6a), and as a result thereof, a collision occurs between the free end (32a) and the forward edge (9), and as the free end (32) rides over the forward edge (9) to slide thereon, the latching plate (31) integral with the memory plate (32) is caused to rotate about the axis of the actuator pin (4), with the hook part (31a) of the latching plate (31) being disengaged from the engagement segment (5) due to the contracting force of the spring (64), and at the same time, the actuator pin (4) is moved in a direction away from the crank portion (81a) of the lock rod (81), which permits the crank portion (81a) to be rotated back to the state shown in FIG. 4(C) by the above-stated spring, causing the simultaneous rotation of the lock plate (81) per se, to thereby bring the lock segment (83) or its hook-like portion (83b) into engagement into the original home aperture (6a'). Thanks to this action of the memory device (M), the upper rail (6b) is locked at a given point assuredly with respect to the lower rail (6a), and therefore, the seat (A) is positively returned to its normal seating position.

While having described the invention as above, it should be understood that the invention is not limited to the illustrated emboidment, but any other replacements, modifications and additions may structurally be possible without departing from the scopes and spirits of the appended claims for the invention.

From the above description, it is appreciated that in accordance with the present invention, the walk-in device (W) and the link member (1) for actuating the same are provided generally on the same line along one of the slide rail (6), with the connecting wire (7) being extending between those two elements, and therefore, the connecting wire (7) is provided along the slide rail (6), which avoids such problem that the wire (7) is loosened due to the contact of the bottom surface of the seat cushion (a) therewith, as found in the aforementioned prior art. There is thus no need to extend the connecting wire (7) under the seat cushion (a) in a manner transversely thereof. In that sense, the wire (7) is advantageously made short in entire length than that of the prior art, which ensures retaining a proper tension of the wire (7) and preventing it from being loosened. Further, in assembling the seat (A), the connecting wire (7) is attached directly to the rotatable lever plate (2) and link member (1), extending therebetween, so that there is eliminated the need for turning upside down the seat (A) in order to extend the wire (7) under the seat (A), as encountered in the prior art. Still further, the memory device (M) is of a far simplified structure, since it is only composed of the memory plate (32) integral with the latching plate (31) and the forward edge (9) of the lower rail (6a).

What is claimed is:

1. An automotive seat with a walk-in device, comprising:
   a seat cushion;
   a seat back connected rotatably with said seat cushion;
   a pair of slide rails provided under said seat cushion, each of said slide rails including a a lower rail fixed to a floor of automobile and an upper rail fitted slidably in said lower rail; and
   a locking mechanism for locking and unlocking said upper rail of said slide rail with respect to said lower rail thereof;
   wherein said walk-in device includes:
      a link member which is provided on one of said pair of slide rails and is to be moved in response to a forward inclination of said seat back;
      a rotatable lever plate which is provided on said one of said pair of slide rails in a free-to-rotate manner;
      a conecting wire which is at its one end fixed to one end of said rotatable lever plate and at its other end fixed to said link member;
      a latching means which is rotatably provided on the other end of said rotatable lever plate;
      an actuator pin provided at said the other end of said rotatable lever plate, said actuator pin being so arranged as to actuate said locking mechanism to lock and unlock said slide rail in response to a rotation of said rotatable lever plate; and
      an engagement means provided at said upper rail of said slide rail, said engagment means being so adapted that said latching means is to engage said engagement means, to thereby retain an unlocked state of said locking mechanism;

2. The automotive seat according to claim 1, wherein it further comprises a memory device which includes a memory plate and a forward edge of said lower rail, and wherein said memory plate is provided at said latching means of said walk-in device, whereby when said seat, after being moved forwardly via said walk-in device, is moved back to its original position, said memory plate collides with and rides over said forward edge of said lower rail, to thereby cause said latching means to disengage from said engagement means and thus actuate said locking mechanism to lock said slide rail for locking said seat at its original position.

3. The automotive seat according to claim 1, wherein upon said upper rail of said slide rail, there is provided a reclining device by which said seat back is inclined forwardly relative to said seat cushion, said reclining device including a rotatable bracket mounted rotatably therein, said rotatable bracket being connected to said seat back, and a projected lug formed integrally on said rotatable bracket, wherein said link member includes an upper projected part formed at its upper end, and wherein said projected lug of said reclining device is disposed in proximity of said upper projected part of said link member, whereby a forward rotation of said rotatable bracket, when said seat back is forwardly inclined, causes said projected lug to contact and move said upper projected part of said link member, thereby rotating said link member so as to actuate said walk-in device.

4. The automotive seat according to claim 1, wherein said rotatable lever plate includes an upper lever part, an intermediate lever part which extends perpendicularly in a downward direction from said upper lever part, and a lower lever part, all of said parts being formed integrally together, wherein said rotatable lever plate is at its lower lever part rotatably secured on a support bracket fixed on said upper rail, and wherein said upper lever part is connected with said one end of said connecting wire.

5. The automotive seat according to claim 4, wherein said lower lever part of said rotatable lever plate is formed in a dogleg-shaped configuration.

6. The automotive seat according to claim 1, wherein said latching means is urged by means of a spring in a direction to engage said engagement means.

* * * * *